INVENTOR.
OLIVER E. SAARI

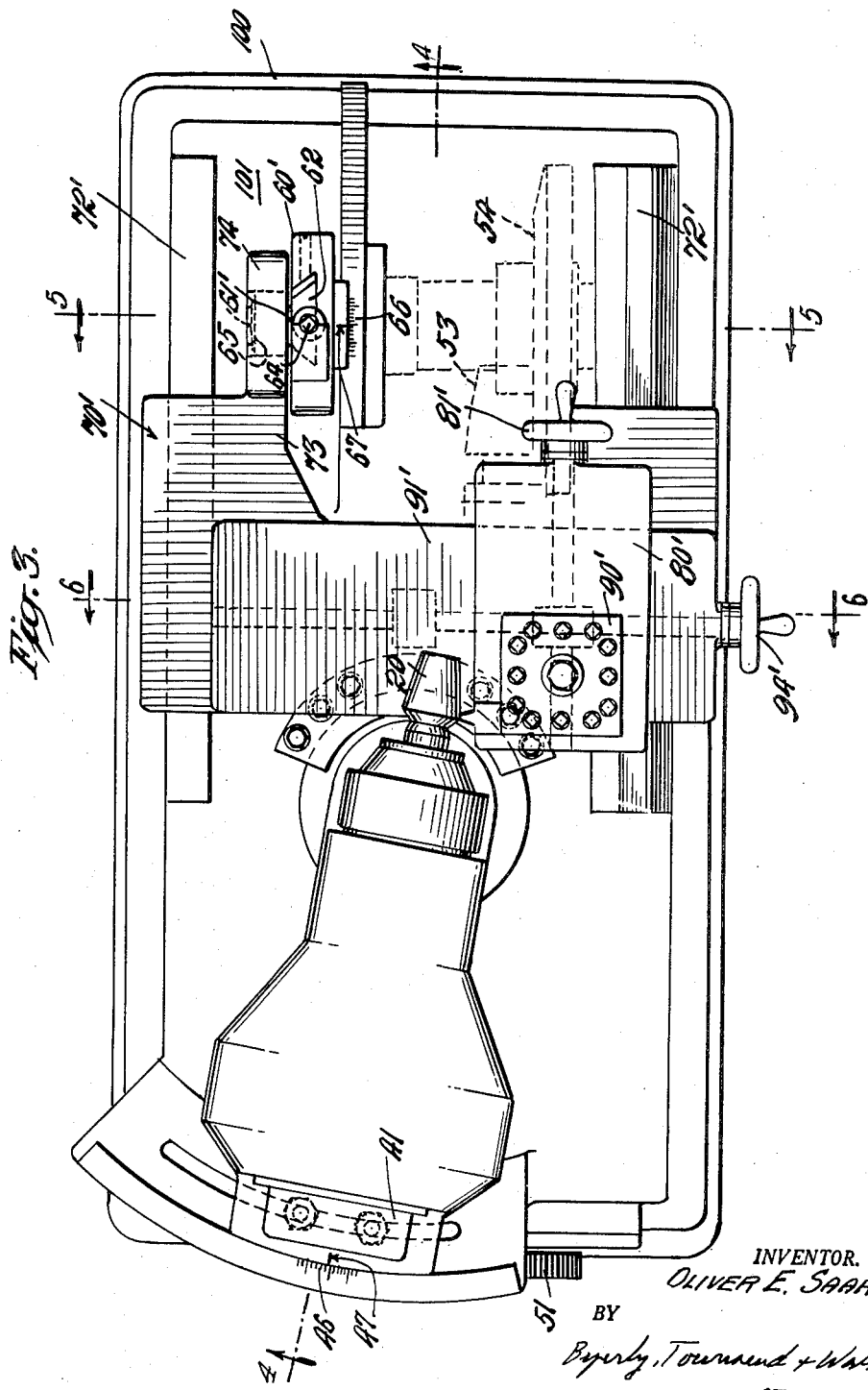

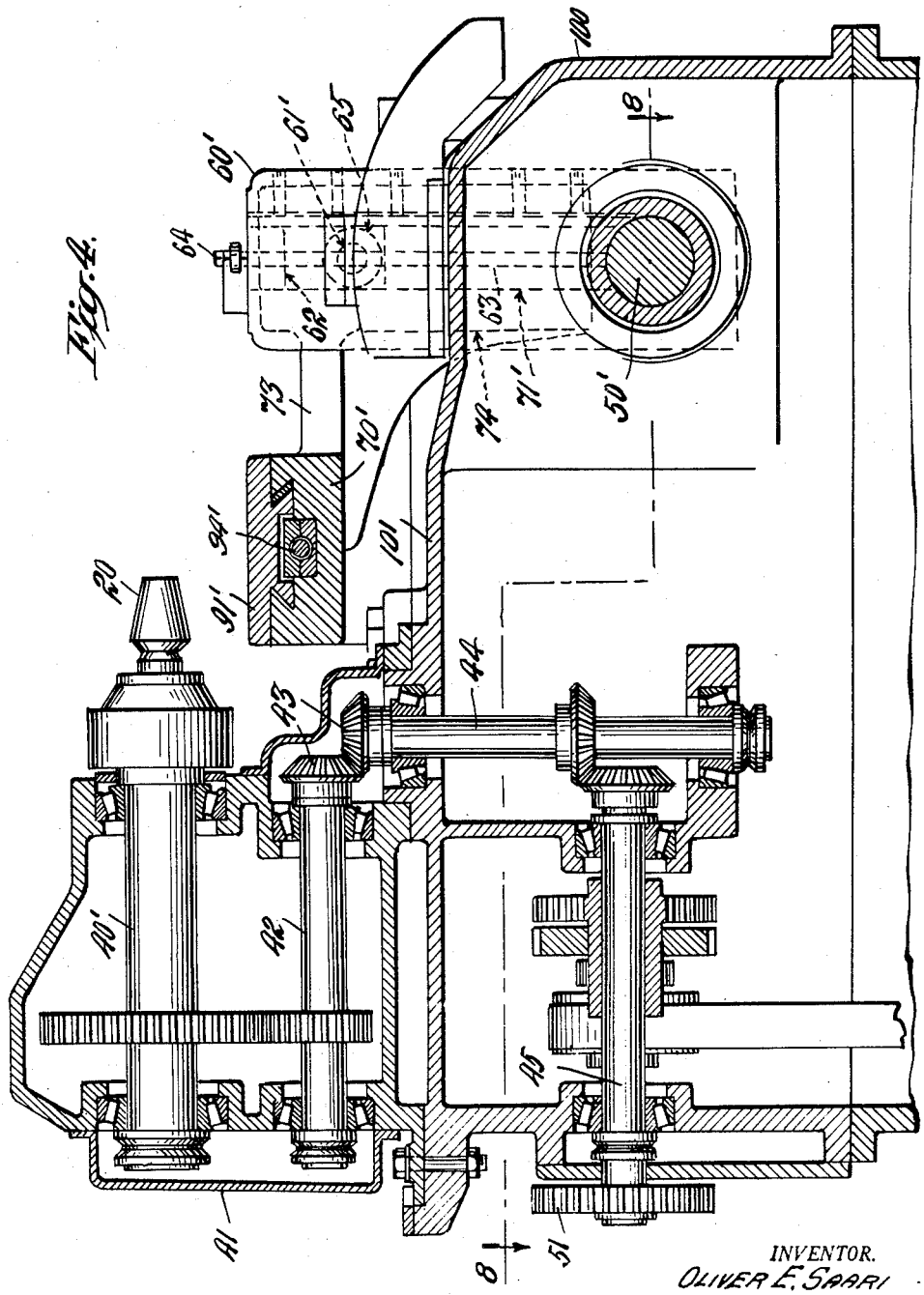

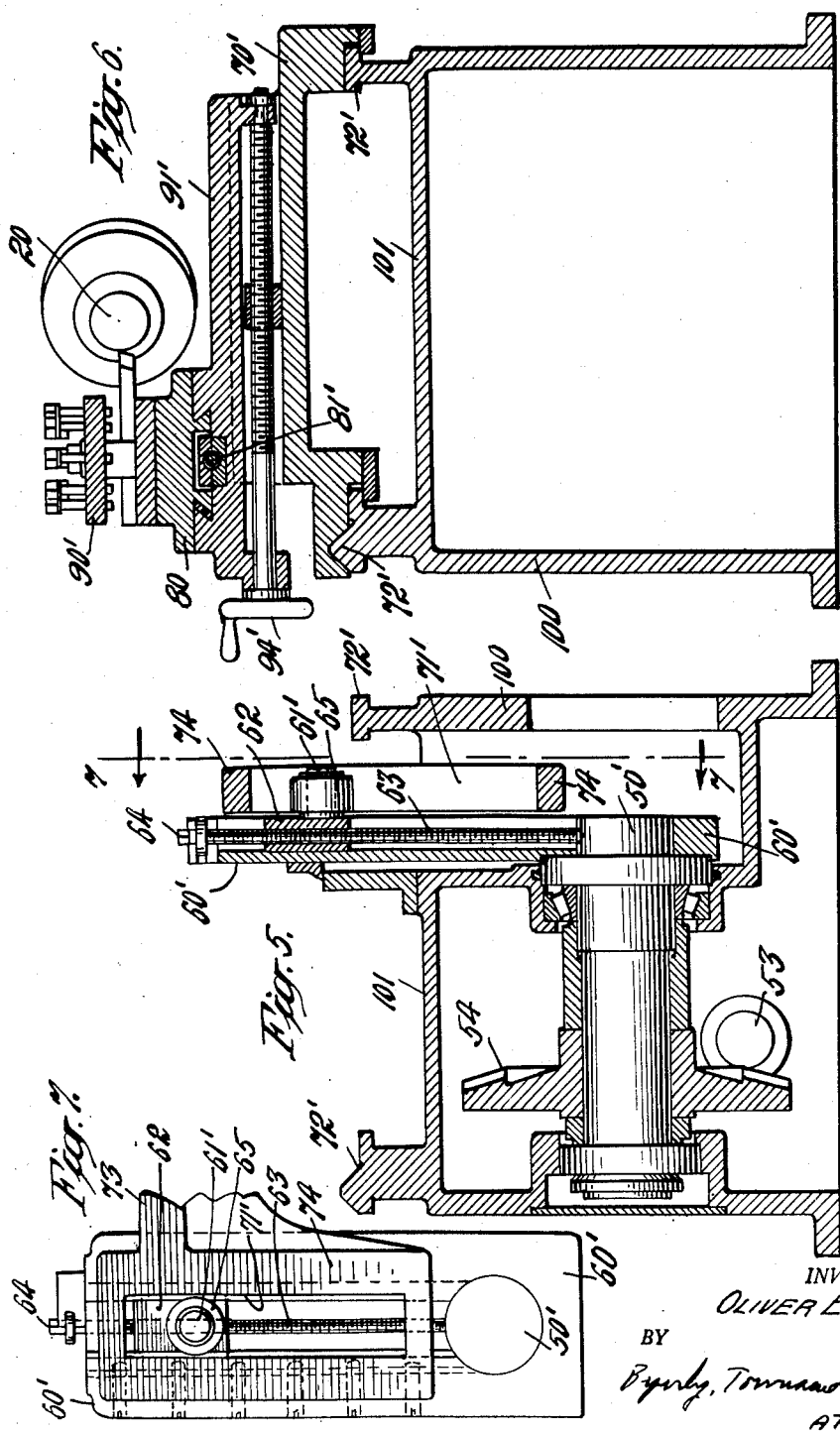

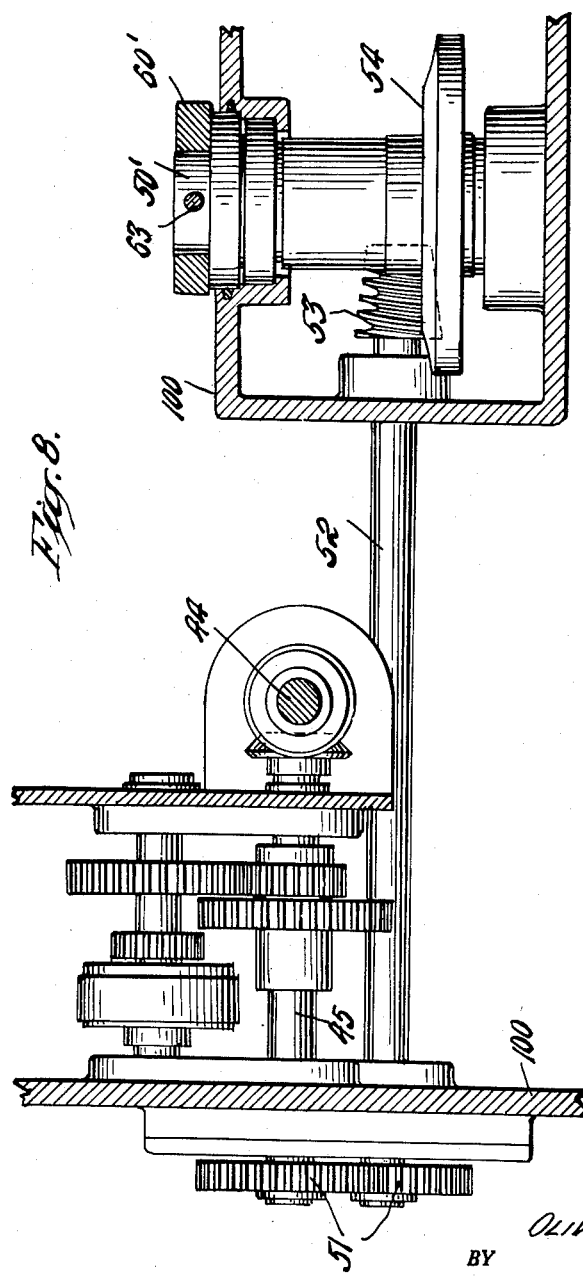

United States Patent Office 2,776,603
Patented Jan. 8, 1957

2,776,603

THREAD-CUTTING MACHINE

Oliver E. Saari, Scheller Park, Ill., assignor to Illinois Tool Works, Chicago, Ill., a corporation of Illinois Application February 18, 1954, Serial No. 411,167

6 Claims. (Cl. 90—1)

This invention relates to thread-cutting machines. A specific object of the invention is to provide for cutting a thread or other spiral groove closely approximating a spiral defined by a complicated mathematical expression.

A thread or other spiral having a lead which varies in accordance with a simple function, such for example as a trigonometric function, may be produced on a machine in which the tool is moved by a mechanism which is a mechanical analogue of the function. When a desired spiral or its lead is specified by the complicated mathematical expression for which a mechanical analogue is not practicable, it might be possible to cut the spiral on a machine in which the progression of the tool was controlled by a cam accurately formed in accordance with numerical results obtained from the mathematical expression. Such a cam would, however, be extremely expensive and the machine containing it would be capable of producing only one particular predetermined spiral.

The machine which I have invented is capable of cutting the spiral groove closely approximating desired spirals determined by a large number of different complicated mathematical expressions. This result is achieved by providing a tool actuator which, by three independent settings or adjustments, may be made to cut a spiral whose lead, curvature and rate of change of curvature are predetermined.

In using the machine to cut a close approximation to a desired spiral specified by a mathematical expression, the numerical values of the lead and the first two derivatives of the lead at an intermediate point of the spiral are determined from the mathematical expression. The thread-cutting machine is set in accordance with these values and will then cut a spiral whose lead and first two derivatives of lead are the same as those of the desired spiral at one intermediate point of the spiral. Thus, in a spiral cut by the machine, variations of the first three orders are the same as those of the desired spiral at one intermediate point. I have found that the spiral cut in this manner very closely approximates the desired spiral for a considerable distance at each side of such intermediate point.

Figure 1:
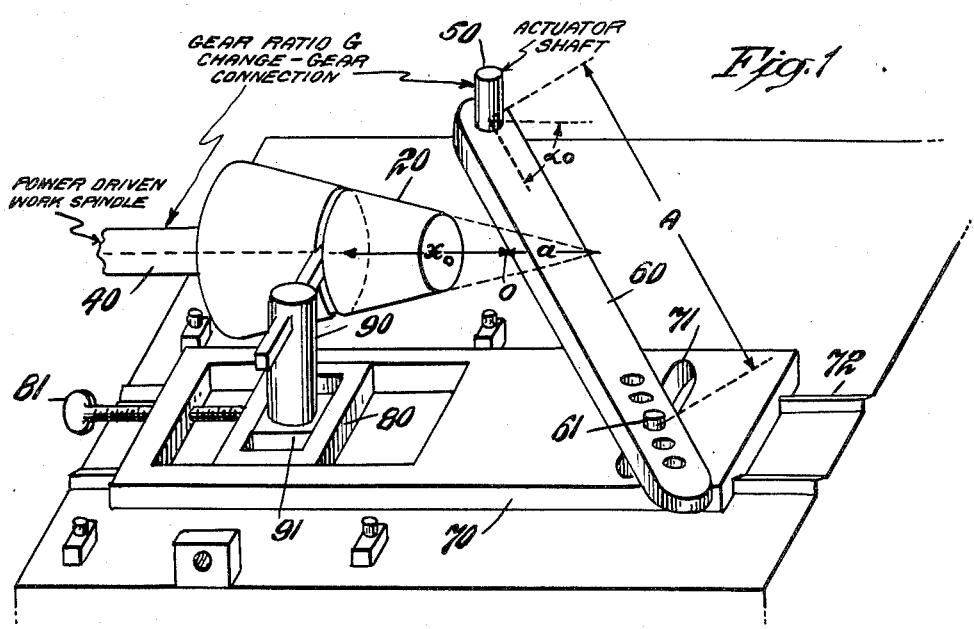
Figure 2:
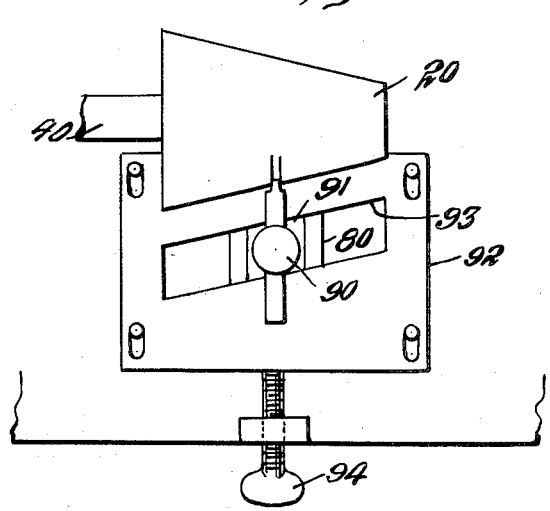

In explaining my invention, I shall refer to the accompanying drawings, in which:

Figs. 1 and 2 are diagrams indicating the operation of a machine embodying my invention, Fig. 1 being a perspective view, and Fig. 2 a partial top view; and Figs. 3 to 8 show the construction of a specific machine embodying the invention, Fig. 3 being a plan view, Fig. 4 a side elevation sectioned on the line 4—4 of Fig. 3, Figs. 5 and 6 transverse vertical sections on the lines 5—5 and 6—6 of Fig. 3, Fig. 7 a section on the line 7—7 of Fig. 5, and Fig. 8 a horizontal section on the line 8—8 of Fig. 4.

The machine shown diagrammatically in Figs. 1 and 2 is provided with two shafts or spindles 40, 50 which are located perpendicularly to each other and are connected by a chain of reducing gearing (not shown) which permits changing the gear ratio G between the two shafts.

The shaft 40 is a power-driven work spindle carrying the work 20.

The shaft 50 is the actuator for the tool and carries an arm 60 having a pin 61 engaging a slot 71 in a carriage 70 which is mounted for rectilinear movement. The pin and slot connection is illustrative and mechanical equivalents may be used to form interengaging and relatively shiftable connecting means between the arm and carriage. In the form shown in Fig. 1, the track 72 on which the carriage 70 moves is parallel to the axis of the work 20. Since the slot 71 is perpendicular to the track 72, the movement given to the carriage by the arm is proportional to the sine of the angle $\alpha$ between the arm and the direction of movement of the carriage.

A slide 80 is mounted on the carriage 70 for adjustment longitudinal of the carriage by means of a screw and hand wheel 81. The slide 80 carries the tool post 90 which is mounted on a transverse slide 91. For simplicity in illustration, a turning tool is shown on the tool post, but it should be understood that a rotary tool or a rotary grinder may in some cases be more desirable.

The slide 91 must, of course, be operated so as to keep the tool in contact with the work as the carriage is moved and to feed it into the work as the cutting progresses. No means for this purpose is shown in Fig. 1, but Fig. 2 shows a cover plate 92 containing a slot 93 which embraces the tool post 90 and causes it to move parallel to the profile of the work when the carriage 70 is moved on its track. Thus, when the work is a conical blank as shown, the slot 93 is a straight slot inclined to the axis of the work at the taper angle of the cone. The tool may be fed into the work by displacing the cover plate and slot 93 laterally by means of a screw and hand wheel 94.

The machine provides for a number of separate individual adjustments which, taken together, determine the motion given to the tool:

The gear ratio G between the work spindle 40 and the shaft 50 may be adjusted by changing gears in the gear connection between them.

The effective length A of the arm 60 may be adjusted by changing the position of the pin 61 on the arm 60. This adjustment is indicated by a series of holes in the arm in Fig. 1, but it is to be understood that a much finer adjustment of the distance A should be provided.

The third adjustment is made by changing the position of the slide 80 by means of the hand wheel 81. This adjustment is used to set the arm 60 at a predetermined angle $\alpha_0$ when the tool engages the work at a selected intermediate plane of the work.

I will now explain how these three adjustments can be made in such a way as to make the lead of the thread cut by the machine and the first two derivatives of this lead equal to the corresponding parameters of a spiral curve to be approximated.

The spiral cut by the tool may be formulated as $$m = f(x) \tag{1}$$

where $m$ is the lead of the thread cut by the tool in inches per radian, and $x$ is the distance in inches along the axis of the work measured from an origin point O.

The lead $m$ of the spiral cut by the tool may be expressed more simply in terms of the angle $\alpha$ between the arm 60 and the direction of travel of the carriage 70. The lead $m$ in terms of $\alpha$ is $$m = \frac{A}{G} \sin \alpha \tag{2}$$

The relation between $\alpha$ and $x$ is apparent from the geometry of the machine and is $$dx = A \sin \alpha \, d\alpha \tag{3}$$

The first and second derivatives of the lead $m$ with respect to $x$ may be obtained from Equations 2 and 3 and are as follows:

$$\frac{dm}{dx} = \frac{1}{G} \cot \alpha \tag{4}$$

$$\frac{d^2m}{dx^2} = \frac{-1}{AG \sin^3 \alpha} \tag{5}$$

The reason that the derivatives of the lead of the spiral cut by the machine may be expressed in such simple form is to be found in the arrangement of the machine which makes the movement of the tool a sinusoidal function of the rotation of the work. The simplicity of these expressions makes it practicable to use them in determining settings of the machine which produce a spiral thread having a predetermined lead curvature and change of curvature.

The lead $m$ of the thread and its derivatives may be evaluated for any chosen value $x_0$ of $x$. Since $\alpha$ is a function of $x$, the value which $\alpha$ has when $x = x_0$ is termed $\alpha_0$. To find the values of the lead $m$ and its first two derivatives when $x = x_0$, it is necessary merely to substitute the constant $\alpha_0$ for the variable $\alpha$ in Equations 2, 4 and 5.

The values of $m$ and its first two derivatives when $x = x_0$ indicate the lead, curvature and rate of change of curvature which the thread to be cut by the machine will have in the transverse plane represented by $x = x_0$, or, in other words, they are the variations of the first three orders in this plane which, for convenience, I will term $v_1$, $v_2$, $v_3$. Substituting in Equations 2, 4 and 5, we obtain:

$$v_1 = \frac{A}{G} \sin \alpha_0 \tag{2°}$$

$$v_2 = \frac{\cot \alpha_0}{G} \tag{4°}$$

$$v_3 = \frac{-1}{AG \sin^3 \alpha_0} \tag{5°}$$

These three equations contain three values which may be changed by adjustments of the machine, namely, $\alpha_0$, $G$ and $A$. Solving the equations for these three values, we obtain $$\cos^2 \alpha_0 = -\frac{v_2^2}{v_1 v_3} \tag{6}$$

$$G = \frac{\cot \alpha_0}{v_2} \tag{7}$$

$$A = \frac{G v_1}{\sin \alpha_0} \tag{8}$$

The machine settings required to make the thread cut by the machine approximate a desired spiral may now be obtained by computing from the equation defining the desired spiral its lead and the first two derivatives of its lead in the transverse plane determined by $x = x_0$, and substituting these values for $v_1$, $v_2$ and $v_3$ in the above Equations 6, 7, 8.

This gives the values of $A$, $G$ and $\alpha_0$ by which the machine is to be set. The change speed gears connecting the shafts 40 and 50 are changed to give the gear ratio between these shafts the calculated value of $G$. The position of the pin 61 on the arm 60 is adjusted to make its distance from the shaft 50 equal to the calculated value of $A$. The arm 60 is set at an angle to the direction of movement of the carriage equal to the calculated value of $\alpha_0$ when the tool is positioned to contact with the work 20 in the selected plane determined by the selected value $x_0$. To make this setting, it is necessary to adjust the relative longitudinal position of the work and the tool without moving the arm 60. This may be done by adjusting the slide 80 by means of the hand wheel 81. If the tool engages the work at this selected plane, the slide 80 may be adjusted to move the carriage 70 and the arm 60 so as to bring the arm 60 to the required angle. If preferred, the arm 60 may first be set at the required angle, and the tool may be brought into the selected plane of the work without moving the arm from its adjusted position. This is done by adjusting the slide 80. This can also be done without the slide by adjusting the longitudinal position of the work on the spindle.

After the settings have been made, the machine is operated to bring the tool to one end of the blank without changing the setting of the slide 80 and without changing the longitudinal position of the work on its spindle. The tool is then set in by means of the hand wheel 94 and the machine is operated in the ordinary manner to cut a thread on the blank. The thread may be made by a single cut or by a number of successive cuts. In the latter case, no change is made in the machine settings between the successive cuts. The thread will closely approximate the desired spiral. It will coincide with that spiral in one transverse plane of the work and will differ only slightly from that spiral in other transverse planes of the work.

To complete this disclosure, I will give a detailed description of a specific thread-cutting machine for approximating a given spiral on the cone of any taper, and I will give a numerical example of the setting of this machine to cut a worm approximating a specific desired spiral.

The machine shown in Figs. 3 to 8 has a hollow frame 100 providing a table top 101.

The work spindle 40' is journalled in a head stock 41. The work spindle 40' is driven by gearing from a stub shaft 42 connected through bevel gears 43 and a vertical shaft 44 with a power shaft 45. The head stock may be swiveled about the vertical shaft 44 so as to place one side of the work 20 parallel to the length of the table. The angular position of the head stock is indicated on a fixed protractor 46 by a mark 47 on the head stock.

The actuator shaft 50' is placed horizontally below the table top at one end of the table. The actuator shaft is connected to the power shaft 45 which drives the work spindle through change speed gears 51 and a shaft 52 carrying a worm 53 which meshes with a face gear 54 on the actuator shaft.

The arm 60' is fixed on one end of the actuator shaft 50' so that it may swing from an inclined position to a vertical position. The arm has a way carrying the slide 62 on which the pin 61' is mounted. The position of the pin 61' on the arm 60' is adjusted by a screw 63 which may be turned by a head 64 at its upper end.

The carriage 70' is mounted in ways 72' for movement lengthwise on the table top. The carriage has an extension consisting of a horizontal member 73 and a vertical member 74 containing a vertical slot 71' in which is a roller 65 mounted on the pin 61'. It will be seen that the arrangement for moving the carriage is similar to that shown in Fig. 1 except that the actuator shaft is in a horizontal plane, and the arm and the slotted portion of the carriage are in a vertical plane. As in Fig. 1, the movement of the carriage is proportional to the sine of the angle between the arm and the direction of motion of the carriage. This angle may be read from a fixed protractor 66 and a mark on an indicator 67 secured to one side of the arm near its upper end.

On the carriage 70' is a cross-slide 91' movable by a screw and hand wheel 94'. On the cross-slide is mounted a longitudinal slide 80' movable by a screw and hand wheel 81'. The tool post 90' is mounted on the slide 80'.

From the above description, it will be seen that the machine is operatively the same as the machine shown diagrammatically in Figs. 1 and 2, when that machine is used with a conical blank. In the machine of Figs. 3–8 the work spindle is first adjusted on its swivel to make its angle with the carriage track, indicated on the protractor 46, equal to the taper angle $t$ of the blank. The carriage is then moved parallel to the side of the blank instead of parallel to the axis of the blank as in Fig. 1.

The movement of the tool itself is the same as that obtained by the carriage of Fig. 1 and the cover plate with the inclined slot shown in Fig. 2; but changes in the axial distance $x$ caused by movements of the carriage are not equal to movements of the carriage but to such movements multiplied by the cosine of the taper angle $t$ of the cone.

In figuring the settings for this machine, it is, therefore, necessary to make a slight change in the equations by introduction of the constant $\cos t$ in Equations 2, 3, 5, 5° and 8. These equations accordingly become:

$$m = \frac{A}{G} \cos t \sin \alpha \tag{2'}$$

$$dx = A \cos t \sin \alpha \, d\alpha \tag{3'}$$

$$\frac{d^2m}{dx^2} = \frac{-1}{AG \cos t \sin^3 \alpha} \tag{5'}$$

$$v_3 = \frac{-1}{AG \cos t \sin^3 \alpha_0} \tag{5°'}$$

$$A = \frac{Gv_3}{\cos t \sin \alpha_0} \tag{8'}$$

I will now give a specific example of setting the machine shown in Figs. 3 to 8 to cut on a conical blank a thread closely approximating a desired spiral defined by a mathematical equation. The blank on which the thread is to be cut is frusto-conical and has a taper angle of 10°. The length of the blank is 1½ inches.

The desired spiral is represented by the following equation:

$$l = \frac{4}{20\left[\frac{(.031091)(4+x)+x}{x}\right] - \frac{\sqrt{[(.031091)(4+x)+x]^2 - .49746}}{(.17633)(4+x)}}$$

where $l$ represents the axial lead of the desired spiral in inches per radian, and $x$ represents distances in inches along the axis of the spiral measured from a fixed point O on the axis of the blank. In this instance, the point O is 2⅜ inches from the smaller end of the blank.

A value for $x$ $$x_0 = 3⅛ \text{ inches}$$

is chosen to determine the transverse plane of the desired curve at which it is to be exactly matched by the spiral cut by the machine. This value is then substituted for $x$ in the above equation to obtain the numerical values in the chosen plane of the lead and first two derivatives of the lead of the desired spiral. They are as follows:

$$l_0 = .212609 \text{ inch}$$

$$\left(\frac{dl}{dx}\right)_0 = .008236 \text{ inch}$$

$$\left(\frac{d^2l}{dx^2}\right)_0 = -.002844 \text{ inch}$$

To obtain the machine settings which will make the lead of the spiral cut by the tool and its first two derivatives identical with those of the desired spiral, the above values for the lead $l$ and its derivatives in the plane determined by $x = x_0$ are substituted for $v_1$, $v_2$, and $v_3$ in Equations 6, 7 and 8', with the following result:

$$\alpha_0 = 70.432°$$
$$G = 43.158$$
$$A = 9.8883 \text{ inches}$$

These are the settings of the machine required to cut on the blank a spiral whose lead and first two derivatives of lead are equal to those of the desired spiral in the transverse plane defined by $$x = x_0 = 3⅛ \text{ inches}$$

The spiral cut closely approximates the desired spiral throughout the length of the work. The thread spiral is identical with the desired spiral in the intermediate plane which is ¾ inch from the smaller end of the work and deviates from the desired spiral by about .0006 at the ends of the work.

There is no difficulty in setting the effective length of the arm 60 by adjusting the slide 62 by the head 64 to place the pin 61 at a distance from the axis of the shaft 50 equal to the computed value of A, and in setting the angular position of the arm 60 as shown on the protractor 66 in accordance with the computed value of $\alpha_0$ by adjusting the slide 80 after the tool has been set in a plane corresponding to $x = 3⅛$ inches. But, unless a large number of change gears are provided, it is difficult to make the gear ratio G exactly equal to the computed value above given. This difficulty may be avoided without making the approximation to the desired spiral appreciably less close.

The value of G is not critical because the values of A and $\alpha_0$ can compensate for errors in it in such a way that the machine will cut a spiral whose lead and first derivative of lead corresponds exactly to those of the desired spiral, while its second derivative of lead is a very close approximation of that of the desired spiral.

Corrected values of A and $\alpha_0$ to compensate for an error in the G setting are obtained as follows:

$$\text{Let } G = G'$$

where $G'$ is a practicable approximation of the computed value of G.

The corrected value of $\alpha_0$ can then be obtained by rearranging Equation 7 as follows:

$$\cot \alpha'_0 = G' v_2 \tag{9}$$

and the corrected value of A, obtained from Equation 8', is as follows:

$$A' = \frac{G' v_1}{\cos t \sin \alpha'_0} \tag{10}$$

This gives a new set of values $G'$, $A'$ and $\alpha'_0$ for settings of the machine which duplicate the lead and the first derivative of the lead exactly. The amount of the error resulting in the second derivative is obtained by computing from Equation 6 the value of the second derivative $v_3$ corresponding to the corrected value $\alpha'_0$ and comparing it with the computed value of the second derivative $$\left(\frac{d^2l}{dx^2}\right)_0$$

In the numerical example given, the gear ratio G may be approximated by simply dropping the decimal part, so that $$G' = 43$$

Then from Equation 9

$$\cot \alpha'_0 = .354152$$

and $$\alpha'_0 = 70.498°$$
$$\sin \alpha'_0 = .942631$$

so that, from Equation 10, $$A' = 9.8482$$

With this new set of values, it will be found that the difference between $v_3$ and $$\left(\frac{d^2l}{dx^2}\right)_0$$

is only .000018 inch. The effect of this small error in matching the second derivative is negligible. Consequently, setting the machine in accordance with the values $\alpha'_0$, $A'$ and $G'$ produces a thread having the characteristics already described in connection with the spiral cut by the machine with the settings $\alpha_0$, $A$ and $G$.

What I claim is:

1. A machine for cutting a spiral of varying lead closely approximating a spiral defined by a complicated mathematical formula, comprising a rotary work spindle, a turnable actuator, reducing gearing connecting the spindle and actuator, a cutting tool, a connection between the actuator and the tool moving the tool at a rate proportional to the sine of the angular turning of the actuator, and separate means for adjusting the gear ratio between the spindle and the actuator, the ratio between the sine of the angular position of the actuator and the movement of the tool, and the angular position of the actuator when the tool engages the work on the spindle at a selected transverse plane of the work.

2. A thread-cutting machine comprising a rotary work spindle, a shaft extending at an angle to the work spindle, gearing connecting the work spindle and the shaft, an arm mounted on the shaft, a carriage mounted for rectilinear movement having a component along the axis of the work spindle, interengaging and relatively shiftable connecting means between the arm and carriage including guide means extending substantially at right angles to the direction of movement of the carriage, a tool on the carriage, means for adjusting the relative longitudinal position of the tool and work without moving the carriage to permit setting the arm at a predetermined angle to the direction of movement of the carriage when the tool engages the work at a selected transverse plane of the work, independent means for adjusting the radial distance from the axis of the shaft to the pin on the arm to set the effective length of the arm, and independent means for adjusting the gearing between the work spindle and the shaft to set the gear ratio between them.

3. A thread-cutting machine comprising a rotary work spindle, a shaft extending at an angle to the work spindle, gearing connecting the work spindle and the shaft, an arm mounted on the shaft, a carriage mounted for rectilinear movement having a component along the axis of the work spindle and containing a slot perpendicular to its direction of movement, a pin on the arm engaging the slot, a tool on the carriage, means for adjusting the longitudinal position of the tool on the carriage to permit setting the arm at a predetermined angle to the direction of movement of the carriage when the tool engages the work at a selected transverse plane of the work, independent means for adjusting the radial distance from the axis of the shaft to the pin on the arm to set the effective length of the arm, and independent means for adjusting the gearing between the work spindle and the shaft to set the gear ratio between them.

4. A thread-cutting machine comprising a rotary work spindle, a shaft extending at right angles to the work spindle, gearing connecting the spindle and the shaft, an arm mounted on the shaft, a carriage mounted for rectilinear movement parallel to the axis of the spindle and containing a slot perpendicular to its direction of movement, a pin on the arm engaging the slot, a tool on the carriage, means for guiding the tool along the surface of the work as the carriage moves, means for adjusting the longitudinal position of the tool on the carriage to permit setting the arm at a predetermined angle to the direction of movement of the carriage when the tool engages the work at a selected transverse plane of the work, independent means for adjusting the radial distance from the axis of the shaft to the pin on the arm to set the effective length of the arm, and independent means for adjusting the gearing to set the gear ratio between the work spindle and the shaft.

5. A thread-cutting machine comprising an actuator shaft, an arm mounted on the shaft, a carriage mounted for rectilinear movement and containing a slot perpendicular to its direction of movement, a pin on the arm engaging the slot in the carriage, a work spindle, a frame supporting the work spindle and pivoted on an axis perpendicular to the axis of the spindle for adjustment of the angle between the spindle and the direction of movement of the carriage, gearing connecting the shaft and the spindle, including intermediate gears co-axial with said pivotal axis of the frame, a tool on the carriage, means for adjusting the longitudinal position of the tool on the carriage, independent means for adjusting the radial distance from the axis of the shaft to the pin on the arm, and independent means for adjusting the gear ratio between the spindle and the shaft.

6. A thread-cutting machine comprising a rotary work spindle for carrying a conical worm blank, a carriage mounted for rectilinear movement parallel to the side of the conical blank on the spindle and containing a slot perpendicular to its direction of movement, an actuator shaft perpendicular to the work spindle, gearing connecting the spindle and the shaft, an arm on the shaft, a pin on the arm engaging the slot in the carriage, a tool on the carriage, and separate means for adjusting the longitudinal position of the tool on the carriage, the radial distance from the axis of the shaft to the pin on the arm and the gear ratio between the shaft and the spindle.

References Cited in the file of this patent
UNITED STATES PATENTS
2,330,921    Rickenmann    Oct. 5, 1943